United States Patent
Schrattenecker

(10) Patent No.: US 6,272,822 B1
(45) Date of Patent: Aug. 14, 2001

(54) UPSTREAM IMPLEMENT FOR COMBINED HARVESTER-THRESHER FOR HARVESTING SOYBEANS AND PEAS

(76) Inventor: Franz Schrattenecker, A-4773 Eggerding (AT)

(*) Notice: Subject to any disclaimer, the term of this patent is extended or adjusted under 35 U.S.C. 154(b) by 0 days.

(21) Appl. No.: 09/341,216
(22) PCT Filed: Nov. 9, 1998
(86) PCT No.: PCT/AT98/00275
  § 371 Date: Jul. 30, 1999
  § 102(e) Date: Jul. 30, 1999
(87) PCT Pub. No.: WO99/23870
  PCT Pub. Date: May 20, 1999

(30) Foreign Application Priority Data

Nov. 7, 1997 (AT) .................................................. 1888/97

(51) Int. Cl.$^7$ ................................................. A01D 23/02
(52) U.S. Cl. ................................................. 56/123; 56/14.3
(58) Field of Search ................................. 56/12.3, 14.5, 56/14.3, 123, 13.6

(56) References Cited

U.S. PATENT DOCUMENTS

| 2,867,962 | 1/1959 | Meyer . |
| 3,662,525 | 5/1972 | White . |
| 3,780,506 | * 12/1973 | Tashiro ................................. 56/14.5 |
| 4,091,602 | * 5/1978 | Williams et al. ..................... 56/14.4 |
| 4,909,025 | * 3/1990 | Reissig et al. ........................ 56/257 |

FOREIGN PATENT DOCUMENTS

| 35 12 619 | 10/1986 | (DE) . |
| 196 32 895 | 2/1998 | (DE) . |
| 1 335 868 | 12/1963 | (FR) . |
| 2 053 063 | 4/1971 | (FR) . |
| 2 290 830 | 6/1976 | (FR) . |

* cited by examiner

Primary Examiner—Thomas B. Will
Assistant Examiner—Árpád F. Kovács
(74) Attorney, Agent, or Firm—Collard & Roe, PC

(57) ABSTRACT

A front-mounted attachment (2) for harvester-threshers (1) for harvesting soy-beans and peas has a resiliently mounted additional cutting mechanism (4), whose cutter drive (5) can be derived from the drive of the cutting mechanism of the harvester-thresher (1). To ensure a simple and trouble-free operation, the cutter drive (5) includes an oil-bath transmission (6) to be connected to the drive of the cutting mechanism of the harvester-thresher (1) via a belt drive (7), which oil-bath transmission is mounted on a lateral runner (8) pivotally mounted at the cutting mechanism (10) of the harvester-thresher so as to be swivelled about a horizontal transverse axis (A) by a swivel arm (9).

1 Claim, 1 Drawing Sheet

Figure 1:
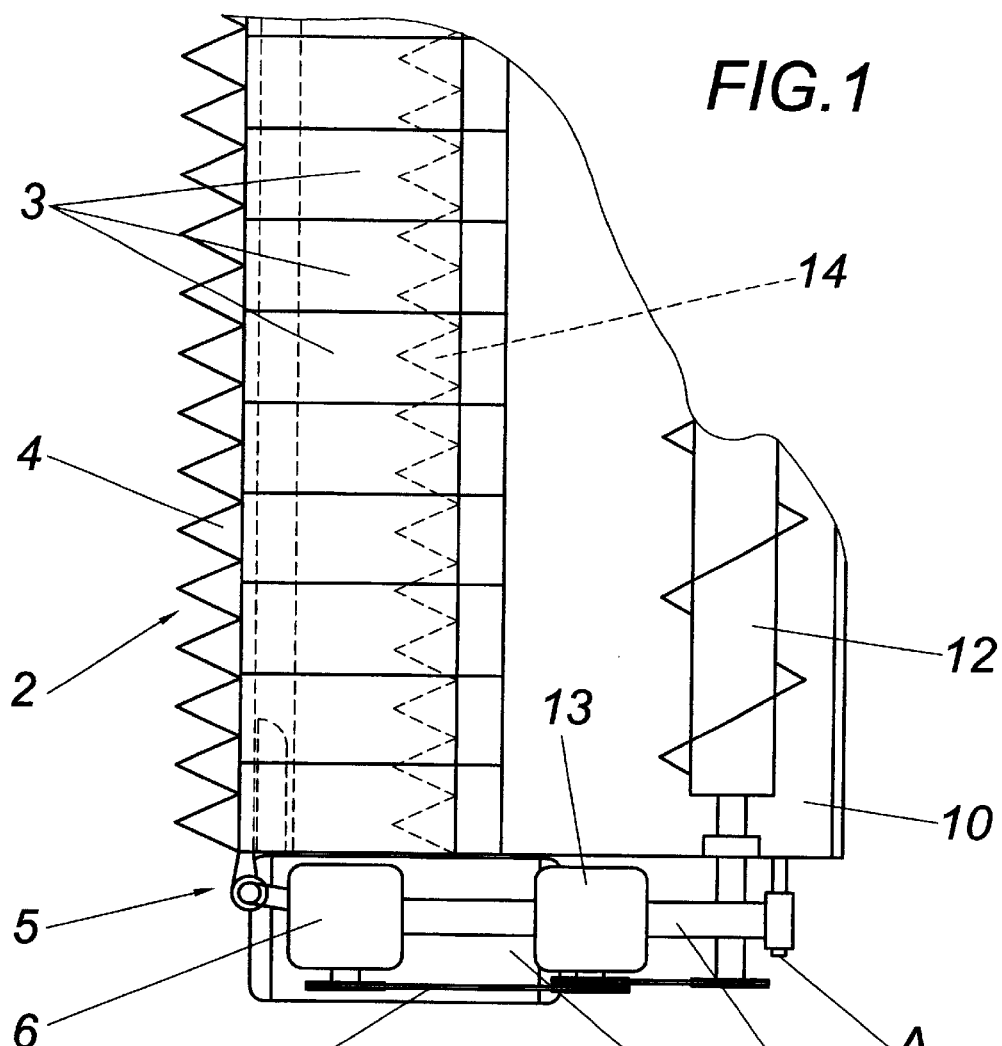

UPSTREAM IMPLEMENT FOR COMBINED HARVESTER-THRESHER FOR HARVESTING SOYBEANS AND PEAS

This invention relates to a front-mounted attachment for harvester-threshers for harvesting soybeans and peas, comprising a resiliently mounted additional cutting mechanism whose cutter drive can be derived from the drive of the cutting mechanism of the harvester-thresher.

To be able to use grain harvester-threshers also for harvesting soybeans and peas, there are special front-mounted attachments with own additional cutting mechanism are provided, which front-mounted attachments are attached at the cutting mechanism of the harvester-thresher and are connected with the drive of the cutting mechanism of the harvester-thresher. So far, however, the drive connection between the cutter drive of the additional cutting mechanism and the drive of the cutting mechanism of the harvester-thresher includes push rods and similar lever mechanisms, which is complicated and frequently leads to malfunctions.

It is therefore the object underlying the invention to create a front-mounted attachment as described above, whose cutter drive involves a functionally reliable operation of the additional cutting mechanism with a simple coupling to the drive of the cutting mechanism of the harvester-thresher.

This object is solved by the invention in that the cutter drive as an oil-bath transmission to be connected to the drive of the cutting mechanism of the harvester-thresher via a belt drive, which oil-bath transmission is mounted on a lateral runner pivotally mounted at the cutting mechanism of the harvester-thresher so as to be swivelled about a horizontal transverse axis by means of a swivel arm. The oil-bath transmission provides for a safe, largely maintenance-free cutter drive of the additional cutting mechanism, and by means of the belt drive it can easily be coupled to the drive of the cutting mechanism of the harvester-thresher, for instance to the oil-bath transmission provided for this drive of the cutting mechanism. The support by means of the runner ensures a support of the oil-bath transmission which can be moved together with the resilient additional cutting mechanism, so that there is obtained a perfect drive connection between the oil-bath transmission and the cutter bar or the like of the additional cutting mechanism.

Figure 2:
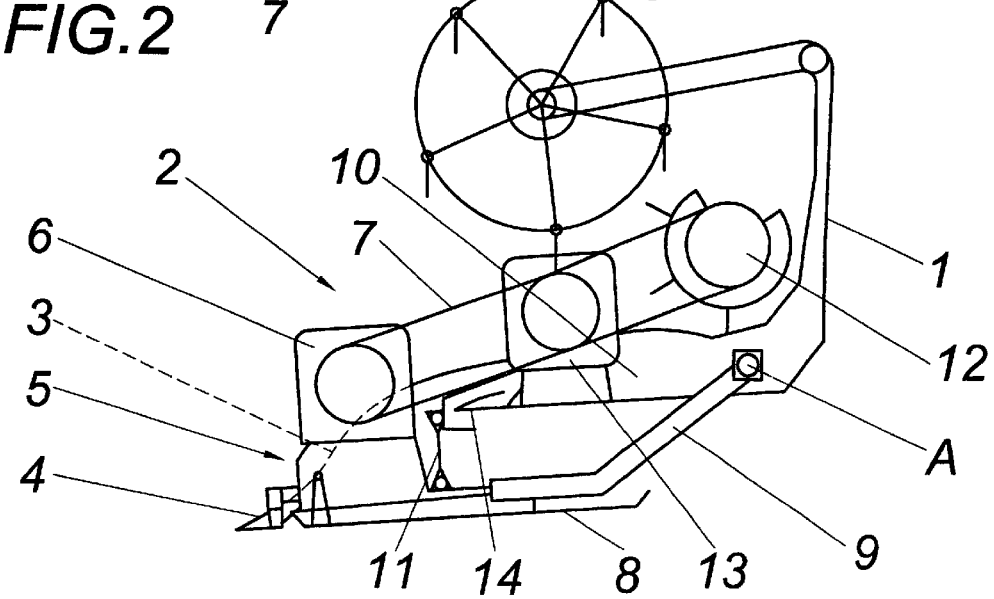

In the drawing, the subject-matter of the invention is illustrated purely schematically, wherein:

FIGS. 1 and 2 represent a top view and a side view of a front-mounted attachment in accordance with the invention.

For harvesting soybeans and peas, a front-mounted attachment 2 is attached at a schematically indicated harvester-thresher 1, which front-mounted attachment has an additional cutting mechanism 4 resiliently mounted via spring plates 3. The cutter drive 5 for the additional cutting mechanism includes an oil-bath transmission 6, which via a belt drive 7 is in drive connection with the drive 13 of the cutting mechanism 10 of the harvester-thresher 1. Driven screw conveyor 12 drives main cutting mechanism 14. Belt drive 7 connects drive 13 with drive 5. The oil-bath transmission 6 is mounted on a runner 8, which is pivotally mounted at the cutting mechanism 10 of the harvester-thresher 1 so as to be swivelled about a horizontal transverse axis A by means of a swivel arm 9, where in addition to the support and coupling of movements there is provided a resilient mounting 11 between cutting mechanism 10 and runner 8.

What is claimed is:

1. A front-mounted attachment mounted on a cutting mechanism of a harvester-thresher for harvesting soybeans and peas, comprising
   (a) a resiliently mounted additional cutting mechanism,
   (b) a drive for the additional cutting mechanism, the drive comprising
      (1) an oil-bath transmission and
      (2) a belt drive connected to the oil-bath transmission,
   (c) a lateral runner whereon the oil-bath transmission is mounted, and
   (d) a swivel arm pivotally mounting the lateral runner on the cutting mechanism of the harvester-thresher for swivelling the lateral runner about a horizontal transverse axis.

* * * * *